US012507665B2

United States Patent
Van Der Kamp et al.

(10) Patent No.: US 12,507,665 B2
(45) Date of Patent: Dec. 30, 2025

(54) METHOD AND ROBOT MILKING DEVICE FOR MILKING A DAIRY ANIMAL

(71) Applicant: LELY PATENT N.V., Maassluis (NL)

(72) Inventors: Adolf Jan Van Der Kamp, Kampen (NL); Pieter Neelus Kool, Berkenwoude (NL)

(73) Assignee: LELY PATENT N.V., Maassluis (NL)

( * ) Notice: Subject to any disclaimer, the term of this patent is extended or adjusted under 35 U.S.C. 154(b) by 241 days.

(21) Appl. No.: 18/246,934

(22) PCT Filed: Sep. 28, 2021

(86) PCT No.: PCT/IB2021/058824
§ 371 (c)(1),
(2) Date: Mar. 28, 2023

(87) PCT Pub. No.: WO2022/074508
PCT Pub. Date: Apr. 14, 2022

(65) Prior Publication Data
US 2023/0371462 A1    Nov. 23, 2023

(30) Foreign Application Priority Data

Oct. 5, 2020  (EP) .................................... 20020456
Oct. 6, 2020  (NL) .................................... 2026629

(51) Int. Cl.
*A01J 5/007*      (2006.01)
*A01K 5/02*       (2006.01)

(52) U.S. Cl.
CPC ............... *A01J 5/007* (2013.01); *A01K 5/02* (2013.01)

(58) Field of Classification Search
CPC .................................. A01J 5/007; A01K 5/02
See application file for complete search history.

(56) References Cited

U.S. PATENT DOCUMENTS

| 7,308,866 B2 * | 12/2007 | Birk ..................... A01K 29/005 |
| | | 119/51.02 |
| 2014/0311412 A1 * | 10/2014 | Hempenius ............... A01J 5/00 |
| | | 119/14.02 |

(Continued)

FOREIGN PATENT DOCUMENTS

| WO | WO 00/13499 A1 | 3/2000 |
| WO | WO 01/17339 A1 | 3/2001 |
| WO | WO 03/030629 A1 | 4/2003 |

OTHER PUBLICATIONS

International Search Report Issued Nov. 30, 2021, in PCT/IB2021/058824, filed on Sep. 28, 2021, 2 pages.

*Primary Examiner* — Joshua D Huson
*Assistant Examiner* — Edgar Reyes
(74) *Attorney, Agent, or Firm* — Oblon, McClelland, Maier & Neustadt, L.L.P.

(57) ABSTRACT

A robot milking device includes a milking site, an animal identification device, robot milking means, a feeding device for providing feed to the dairy animal during the milking based on a feed allowance, and a controller for the robot milking system and for updating feed allowance. The method includes selecting a future time period, determining a free capacity C of the robot milking system, determining a sub-group of the dairy animals for which the controller may continue to provide feed after the milking, milking and feeding the dairy animals which visit the milking system, and additionally feeding a dairy animal from the sub-group depending on the determined free capacity C, if the dairy animal still has a feed allowance for milking.

18 Claims, 3 Drawing Sheets

(56) References Cited

U.S. PATENT DOCUMENTS

Figure 1:
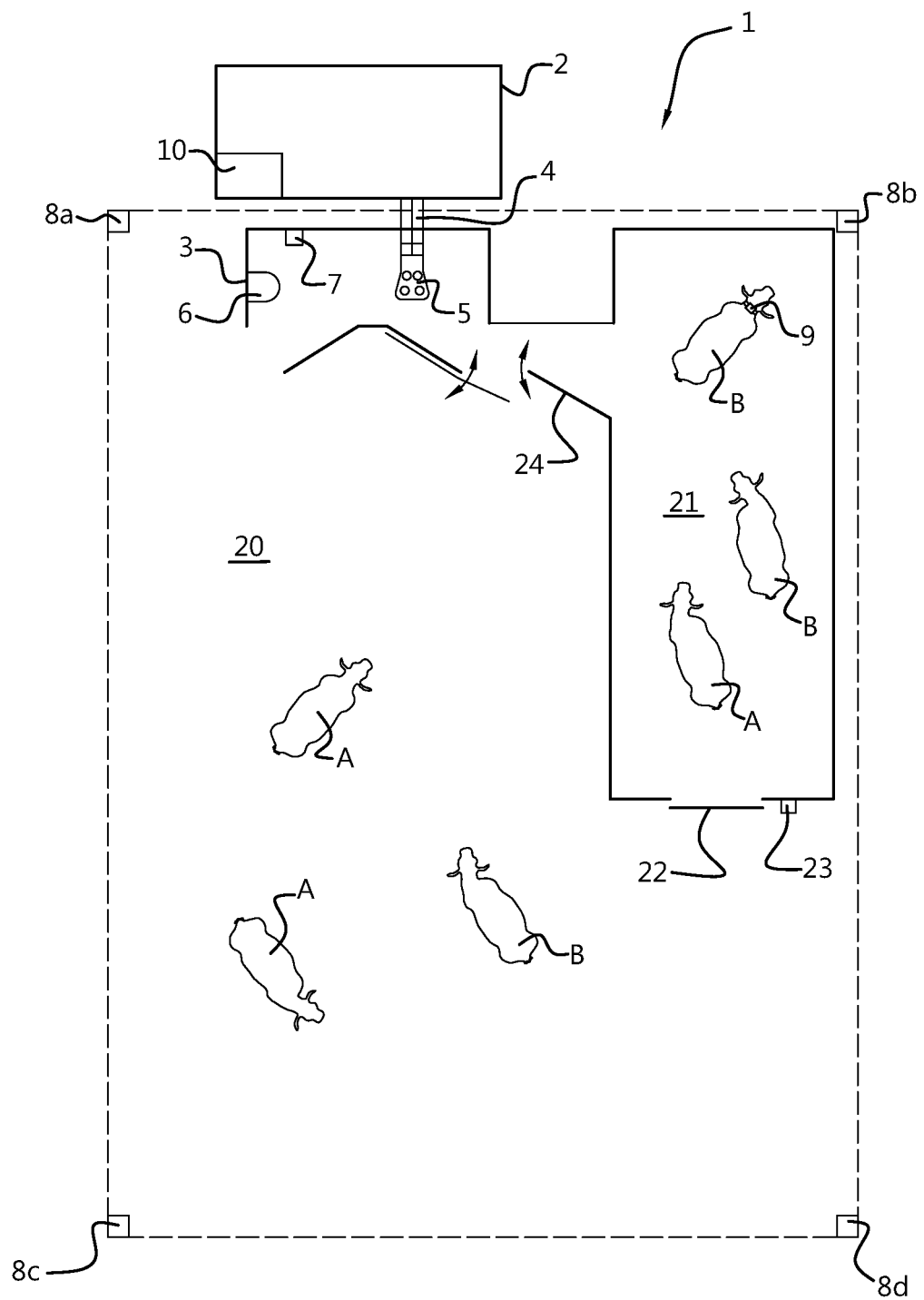

| | | | |
|---|---|---|---|
| 2015/0208608 A1* | 7/2015 | Brummel | A01K 5/0275 |
| | | | 119/14.04 |
| 2022/0061260 A1* | 3/2022 | Gross | A01K 1/0023 |
| 2022/0284725 A1* | 9/2022 | Harty | G06T 7/0012 |

* cited by examiner

METHOD AND ROBOT MILKING DEVICE FOR MILKING A DAIRY ANIMAL

CROSS REFERENCE TO RELATED APPLICATIONS

This application is a National Stage entry under 35 U.S.C. § 371 of PCT/IB2021/058824, filed on Sep. 28, 2021, and claims priority to Netherlands Patent Application No. 2026629, filed on Oct. 6, 2020 and European Patent Application No. 20020456.8, filed on Oct. 5, 2020, the entire contents of which are incorporated herein by reference.

In a first aspect, the invention concerns a method for automatically milking and feeding a group of dairy animals by means of a robot milking device which is provided in an area in which the dairy animals can move freely, and which comprises: a milking site for receiving a dairy animal, an animal identification device for determining an animal identity of said dairy animal, robot milking means for fully automatically extracting milk from said dairy animal during a milking, a feeding device for providing feed to said dairy animal at the milking site during said milking on the basis of a feed allowance for said dairy animal, and a controller which is configured for controlling the robot milking system and updating the feed allowance per dairy animal, wherein the method comprises the following steps: selecting a future time period, determining a sub-group of the group of dairy animals for which the controller may continue to provide feed after said milking, milking, and during the milking feeding the dairy animals which visit the milking system, and additionally feeding a dairy animal from the sub-group if said dairy animal still has a feed allowance after milking.

Such robot milking systems are known per se. They almost always have a concentrate feeding device which provides concentrate to the dairy animal during milking. Not only is a robot milking device, with its always provided animal identification device, ideally suited for providing an individualised portion of concentrate to a dairy animal, but concentrate is also not only usually necessary for an adequate ration for the dairy animal but also a very attractive feed, so that a sufficiently high frequency of visits to the robot milking device can be guaranteed.

A disadvantage of robot milking devices is that in view of the costs, it is desirable to optimise and usually maximise the milking capacity. Since most dairy animals are milked more quickly than they can consume their assigned concentrate portion, the dairy animals however run the risk of a feed deficit. This applies especially in the particular but very common situation that the robot milking device is the only place to obtain the concentrate. Otherwise, not only would the luring to the milking device work less well, but also a feed deficit could then be made up in another concentrate station so the milking capacity does not have to suffer as a result.

To offset this disadvantage, it is naturally possible to guarantee that (some or all) dairy animals can always eat their assigned portion of concentrate in the robot milking device. Thus the Lely Astronaut® A3/A4/A5 has the option of "Priority feed" with which a user can specify, for one or more dairy animals, that these should always be completely fed. The disadvantage of this is that the total milking capacity of the robot milking device is lowered, since additional feeding is carried out on each milking, even if at that moment, because of full occupation, no free robot capacity is available. Therefore the following animals must then wait an unnecessarily long time.

The invention is intended to at least partially eliminate the above-mentioned disadvantage, and in any case provide a robot milking device which reduces the risk of a feed deficit without initially reducing the milking capacity. The invention thus provides a method as claimed in claim 1, in particular a method for automatically milking and feeding a group of dairy animals by means of a robot milking device which is provided in an area in which the dairy animals can move freely, and which comprises: a milking site for receiving a dairy animal, an animal identification device for determining an animal identity of said dairy animal, robot milking means for fully automatically extracting milk from said dairy animal during a milking, a feeding device for providing feed to said dairy animal at the milking site during said milking on the basis of a feed allowance for said dairy animal, and a controller which is configured for controlling the robot milking system and updating the feed allowance per dairy animal, wherein the method comprises the following steps: selecting a future time period, determining a free capacity C of the robot milking system as an expectation value for the total time during said future time period that the milking system will not be occupied by a dairy animal, determining a sub-group of the group of dairy animals for which the controller may continue to provide feed after said milking, milking, and feeding during the milking, the dairy animals that visit the milking system, and additionally feeding a dairy animal from the sub-group depending on the determined free capacity C, if said dairy animal still has a feed allowance after milking.

The invention here uses the following principle. The robot milking device (also referred to below as the "robot") which is provided in the area in which the dairy animals can move freely is not always visited with constant frequency. The area need not be a parlor but may also be a meadow or even an unfenced piece of common land, as long as the dairy animals can visit the robot freely. It is known in itself that for example dairy cows visit the robot less often at night. It may even occur that the robot is idle for some time, while at other times the robot is continuously occupied. The occupation degree of the robot may also change as a function of the number of dairy animals, for example because animals have been dried off or for health reasons removed from the herd, or animals are added. In addition, the milk production changes during the lactation so that the associated milking time may also change. All in all, sometimes there is no spare time but sometimes there is plenty of spare time in the robot.

It is then advantageous to use the times at which the robot is less occupied to provide some of the animals which visit the robot with some or all their feed assigned according to their feed allowance. In busy periods, the robot need not allow extra time for providing feed. It is thus also possible that the dairy animals "recover" a smaller or larger part of any feed deficit at such quiet times. Because the robot provides the additional remaining feed depending on the free capacity, this will not happen if there is no (more) free capacity, so the robot does not lose milking capacity. Thus it may be that, because of a number of milkings which take unexpectedly longer, or because of a fault or because of a longer time in which no dairy animal visits the robot, free capacity is unused or reduced. In such cases, the robot will be able to provide additional feed to only some of the dairy animals from the sub-group, or in exceptional cases no such animals. Nonetheless, the present invention is able to reduce the risk of feed deficit without this costing milk capacity. Note that "feed deficit" is here understood as an overlarge "feed allowance". Furthermore, feeding takes place on the basis of the feed allowance, so that this stops when the feed allowance has been consumed. The feed allowance, as known, increases per time unit with the ration proposed for the time unit, and on each feeding event reduces by the ration eaten. For example, if a cow receives 9 kg of concentrate per day, the feed allowance increases by 0.375 kg/hour. Since dairy animals are identified in the robot, the visit time is recorded, and the provided, and often also the eaten, amount of concentrate is recorded, it is simple for the robot to update the feed allowance.

It is important to note that only a sub-group of the dairy animals is considered for such additional feeding action. Therefore it can suitably be prevented that dairy animals which have less need of such an action use up the sometimes slight available free capacity. Thus the risk of a feed deficit, and certainly the maximum feed deficit, for the entire herd can be reduced. It may in some cases occur that the sub-group contains the entire group of dairy animals, for example if the animals in lactation are a much smaller group than what the robot can handle, but it is important not only that the sub-group is not fixed but can change, and in addition that the dairy animals from the sub-group are not necessarily given additional feed after a milking because that depends on the free capacity of the robot.

Furthermore, the robot need only proceed to provide concentrate if the dairy animal concerned still has a feed allowance after milking. Thus it may be that the milk cup connection action takes an unexpectedly long time, or a milking cup becomes detached early in the milking so that milking is extended, etc. In such cases, a dairy animal that usually has feed allowance left after milking may eat its complete feed allowance during a longer milking. Also, for various calculations, an expectation value of the feed allowance after milking is used. This is calculated for example by looking at the average visit time to be expected for the dairy animal on the basis of a historic visit time, then calculating the feed allowance belonging to the average visit time to be expected, and then looking at how much the dairy animal eats on average if the feed allowance has such a value. The remainder is then the expectation value of the feed allowance yet to be added. In addition, other calculation methods may be followed.

It should also be noted here that it is not necessarily the case that a dairy animal is actually milked during a visit to the robot. It is always possible that a dairy animal from the sub-group visits the robot but need not yet be milked. It may however be advantageous, for example in the case of sufficient free capacity C, and if the animal still has feed allowance or a certain minimum feed allowance, not to eject the dairy animal from the robot but still provide concentrate. In addition, the time for such additional feeding action is then included in the free capacity C, in the sense that C must then be reduced.

Particular embodiments are given in the dependent claims and in the following part of the description.

In some embodiments, the step of determining said sub-group comprises a user entering in the controller the identities of only part of the group of dairy animals. This may be useful for example if only a small number of animals should be guaranteed to receive their concentrate ration, such as animals recovering after illness. The controller then chooses from this sub-group the dairy animals for which additional concentrate must be given, in any case until the free capacity is used up. The user may then dynamically adapt the sub-group at any moment, for example when the dairy animal has sufficiently recovered, or if a new case of illness has occurred etc.

In some embodiments, the step of determining said sub-group is carried out automatically by the controller. This has the advantage that some of the activities are taken out of the hands of the manager of the group of dairy animals, and creates the possibility of possibly dynamic optimisation of the feed provision for the dairy animals.

In practical embodiments, the step of determining said sub-group comprises, per dairy animal, attributing a selection priority on the basis of a selection criterion that comprises at least said expectation value of the feed allowance after milking, and selecting the dairy animals with the highest selection priority in such a number as to comply with a predefined selection criterion. As already pointed out above, it will not be equally important for each dairy animal in the group to prevent a feed deficit, for example because the feed deficit for the one animal almost never becomes large, while for another it may become large. Thus a selection priority may be attributed to each dairy animal, wherein a high selection priority means a strong chance of selection in the sub-group, and vice versa. For example, the selection priority may be expressed in terms of the expectation value of the remaining feed allowance after milking, wherein a high number means a higher priority. The number may also be scaled up or for example rise more greatly than the number. In addition, it is possible not to take the absolute remaining feed allowance, but for example the relative remaining feed allowance with respect to the daily ration. It may also be specified that the remaining feed allowance must be greater than a predefined threshold value etc. Thus account can be taken of differences in daily feed ration.

In particular, the selection criterion comprises that a sum, to be calculated by the controller, of the eating times per dairy animal from the sub-group, belonging to said expected value of the respective feed allowance after milking, is at most equal to said free capacity or a predefined mathematical operation on said free capacity. In this way, the sub-group can be matched to the available free capacity, so that as many dairy animals as possible can profit from the possibility of consuming their complete feed allowance in the robot, without loss of milking capacity. Said eating times may for example be determined on the basis of historic visits to the robot. The duration thereof may be stored together with the quantity of concentrate eaten. The expectation value of the remaining feed allowance may then be divided by this determined eating rate, from which the additional eating time per dairy animal can be determined. Again, other ways of determining the eating times are possible, such as targeted test measurements which for example may take account of any slower eating at the end of milking or afterwards.

It is here possible to simply equate the sum of the calculated extra eating times with the available free capacity, and then for example—but not necessarily—filling the free capacity with these eating times, on the basis of and in the order of the selection priority. Thus the sub-group can be matched to the available free capacity. In particular, said mathematical operation is a multiplication of the free capacity by a number between 0.8 and 1.5. It is thus possible to make available less than the complete free capacity for additional feeding, such as between 80% and 100%. This takes account of any unexpected events such as milkings which are disrupted or otherwise take longer. There is then some flexibility in milking and feeding. Secondly, this may avoid the robot standing idle while waiting for a following visit. It is also possible to reserve rather more than the free capacity, such as between 100% and 150%. In theory this should lead to a shortage of robot capacity and hence a loss of milking capacity, but this may take account of the fact that probably not all dairy animals selected in the sub-group will actually visit the robot in the future period. In this way there will always be enough dairy animals to visit to the robot and be given their complete feed allowance. The extent of overcapacity (i.e. multiplication by a number larger than 1) may be determined in practice from for example a measured spread of the visits. A group of dairy animals making regular visits here requires a smaller number than a group making irregular visits. Furthermore, this case may require earlier adaptation of the sub-group dynamically to free capacity already used.

In some embodiments, the selection priority is partly attributed on the basis of a probability with which the dairy animal will be milked in said future time period. As already mentioned above, it naturally cannot be guaranteed that a dairy animal with a high chance of remaining feed allowance will actually visit the robot in the future period. For example, the dairy animal concerned may just have been milked, so that it will not visit the robot in the coming hours. Then there is less point in attributing a high selection priority. According to this embodiment, this can be taken into account by adapting the selection priority as a function of the chance of a visit to the robot during the future time period. This chance may be determined on the basis of a historic visit frequency etc. Note that it is here possible to include only robot visits at milking readiness, or every arbitrary visit. For it is possible to additionally feed dairy animals with a great feed deficit even if they are not ready for milking.

In some embodiments, the selection priority is partly attributed on the basis of one or more animal properties other than the expected feed allowance after milking, in particular the number of days in lactation and/or the lactation number and/or the milk production. By means of such animal properties, the manager of the group of dairy animals or the controller can take account of the features which are relevant for feeding. For example, for dairy animals in the lactation build-up phase, i.e. the number of days in lactation is less than the (expected or average) day of peak production, it is more important than for other dairy animals to provide sufficient feed, or at least prevent a feed deficit. Another consideration may be to treat the most productive dairy animals in this way, for example because they run a greater risk of having a (great) feed deficit or, economically viewed, they are more important for the farmer. Furthermore, other properties such as the above-mentioned health properties are also possible as relevant factors in determining the selection priority.

In particular embodiments, the robot milking device comprises an upstream waiting area, wherein the controller is configured to determine the animal identity of the dairy animals in the waiting area, and wherein the selection priority is partly attributed depending on the presence of a dairy animal in the waiting area. In such robot milking devices, it can better be predicted which dairy animals will attend shortly for a visit to the robot. In this way, the selection priority and hence the sub-group can be adapted accordingly. For example, the chance of a visit to the robot can be determined much more precisely, and for example dairy animals for which there is no high expectation value for a remaining feed allowance after milking, can be added to the sub-group. It is after all better to give these dairy animals their complete feed allowance than to wait unnecessarily for dairy animals which, according to the information from the waiting area, will not present themselves.

In yet further advantageous embodiments, the robot milking device furthermore comprises a dairy animal location device which is configured for determining a location of the dairy animal in the area, and the selection priority is partly attributed on the basis of the determined location in the area, in particular on the basis of a distance from the determined location to the robot milking device, more particularly a change in the location or distance. In these embodiments, for example the controller can better estimate the probability, per dairy animal, that this dairy animal will visit the robot in the future time period. In any case, the dairy animal at a great distance from the robot or an increasing distance will have a lower probability (and hence get a lower selection priority) than a dairy animal with a small or rapidly decreasing distance. Thus it can better be prevented that part of the free capacity is unnecessarily reserved for dairy animals which will probably not yet appear in the future time period.

The method of determining the free capacity C is not particularly limited. For example, the free capacity is determined on the basis of historic values such as a measured idle time and/or the visit frequency to the robot milking device, and/or planned periods for cleaning or maintenance of the robot milking device, in each case as a function of the time of day. An idle time is for example a time between a dairy animal leaving the robot and the next following visit by a following dairy animal. Also, the time in which a robot is not available because it is undergoing cleaning or maintenance, is also idle time. The maintenance and/or cleaning may be planned and unplanned. Planned events can be taken into account much more easily than unplanned events, for which, however, for example a historic average can still be taken into account. Furthermore, it is also possible, alternatively or additionally, to look at the visit frequency and calculate or adapt the free capacity on the basis of said frequency and an average expected milking duration, or in another suitable fashion. It is emphasised that the visit frequency varies as a function of the time of day, but this may also vary over the course of the year, for example because of the influence of grazing etc.

Determining the future time period for which the calculation of free capacity etc. must be made is also not particularly limited. In particular, said future time period is the time period until a future planned cleaning or maintenance, or a predefined fixed time period such as 1 hour. For a longer period, such as often the time period until a planned cleaning, in total more free capacity is available for additional feeding than in a short period. However, for a shorter, or at least nearer, time period, it is possible to calculate and estimate better and more precisely which dairy animals require how much time for additional residual feed. In practice, it will be easy to determine which period gives the desired results.

In important embodiments, the method furthermore comprises repeating the method according to the invention either after a predefined number of milkings or visits of dairy animals to the robot milking device, or after a predefined time. The free capacity C will however always change over time, and certainly after milking, with or without additional feeding. Thus a milking may take shorter or longer than expected, the visit frequency may be different from that expected etc. It is then advantageous to adapt the calculations either after each milking or each visit of a dairy animal to the robot, or after expiry of a predefined time such as 10 minutes or the hour. The calculations comprise not only the free capacity, but also the sub-group, the selection priorities etc. Indeed, if a dairy animal with a high selection priority visits the robot (early or late) in the future period, and for example by chance also has such a long milking event that the complete feed allowance can be given, not only should said dairy animal be removed from the sub-group or its selection priority lowered, in any case for the momentary "future" period (which is now being used), but it may also be that the further sub-group must be adapted to the now available free capacity etc. Repeating the method with the updated momentary situation is then advantageous. Moreover, it is for example useful or even desirable for all dairy animals to stop additional feeding if the used time for additional feeding exceeds the expected free capacity. The capacity is then "consumed" for the present "future" time period. It is noted that the term "future time period" applies before the calculations. This time period is no longer in the future as soon as the associated milking and feeding begins, or rather as soon as the time period concerned has begun. For the sake of clarity, the term "future time period" is still used for this time interval.

Besides the features which concern the additional feeding after milking, it is also possible to provide extra feeding during a milking. For example, it is possible, at least for animals from the sub-group of dairy animals which do not receive additional feed after milking, to provide energy-rich supplements or otherwise more energy-rich feed during milking, in order thus to be able to provide the complete feed allowance during the milking. Thus it is possible to add propylene glycol or another additive to the concentrate. So initially all animals can be completely fed in times when there is free capacity C in which the other sub-group of dairy animals receives additional feed after their milking. It is also possible, if there is no free capacity C, to provide extra feed for all animals in this way. The present invention however still brings advantages with respect to systems which work with such "booster" feeding. For the method according to the invention uses fewer such additives and the animals may be fed in a less onerous fashion.

The invention also concerns a robot milking device as claimed in claim 14, in particular a robot milking device for milking a group of dairy animals, comprising a milking site for receiving a dairy animal, an animal identification device for determining an animal identity of said dairy animal, robot milking means for fully automatically extracting milk from said dairy animal during a milking, a feeding device for providing feed to said dairy animal at the milking site during said milking on the basis of a feed allowance for said dairy animal, and a controller which is configured for controlling the robot milking system and updating the feed allowance per dairy animal and for performing the method according to the present invention, wherein the robot milking device is provided in an area in which the dairy animals can move freely. Again, it is emphasised that the robot is provided in an area (meadow, parlor, nature reserve) in which the dairy animals such as cows or goats can freely visit the robot. In any case, in the case of scheduled milking events wherein the dairy animals are driven to the milking device, it is simple to prevent feed deficits. However, the principle of free capacity is not used here as the milking is planned more precisely.

Particular embodiments of the robot milking device, also called a robot, largely correspond to the particular embodiments of the method. In particular, the robot also comprises an upstream waiting area and the controller is configured to perform the method according to the invention, wherein the controller is configured for determining the animal identity of the dairy animals in the waiting area and for attributing the selection priority partly depending on the presence of a dairy animal in the waiting area.

In further embodiments, the robot milking device also comprises a dairy animal location device which is configured for determining a location of the dairy animals in the area, and the controller is configured for determining a location of the dairy animals in the area and for attributing the selection priority partly on the basis of the determined location in the area, in particular on the basis of a distance from the determined location to the robot milking device.

For said embodiments, the advantages which have already been presented for the method also apply, so for the sake of conciseness, they need not be repeated here.

Figure 2:
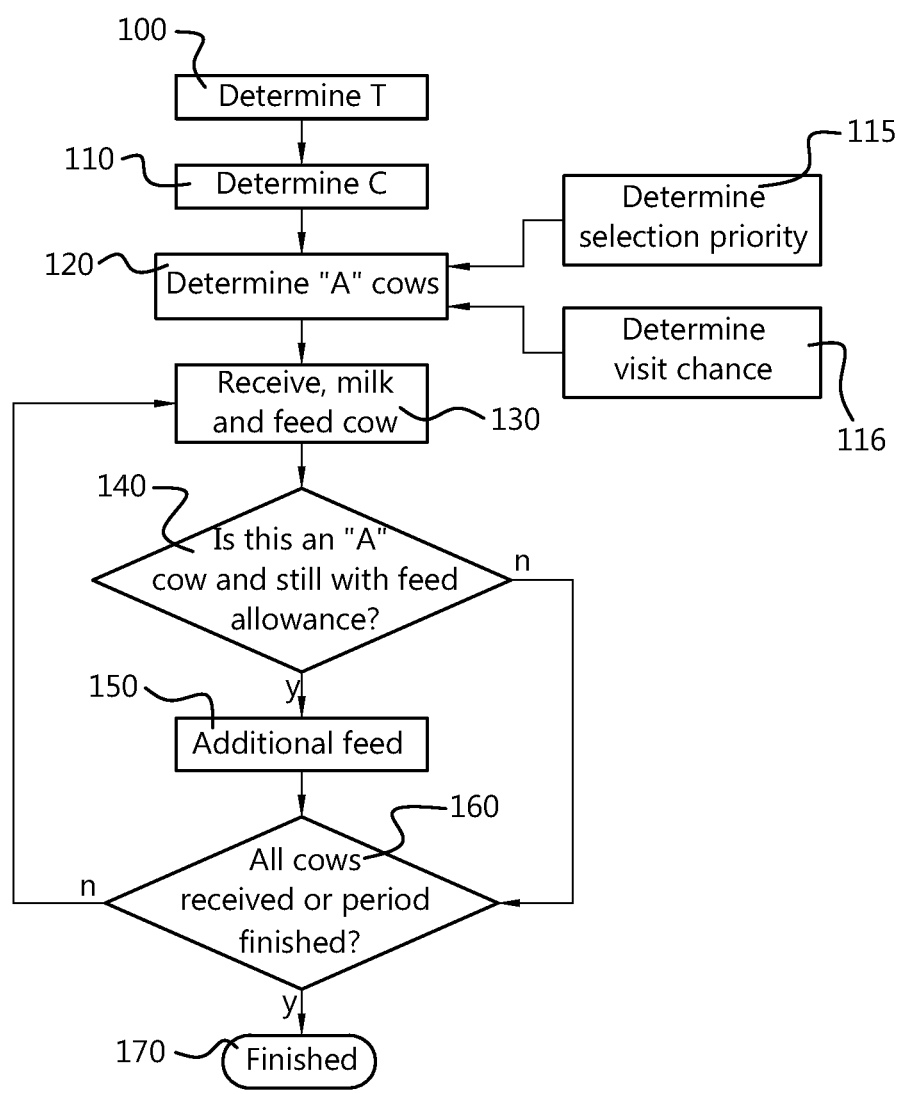
Figure 3:
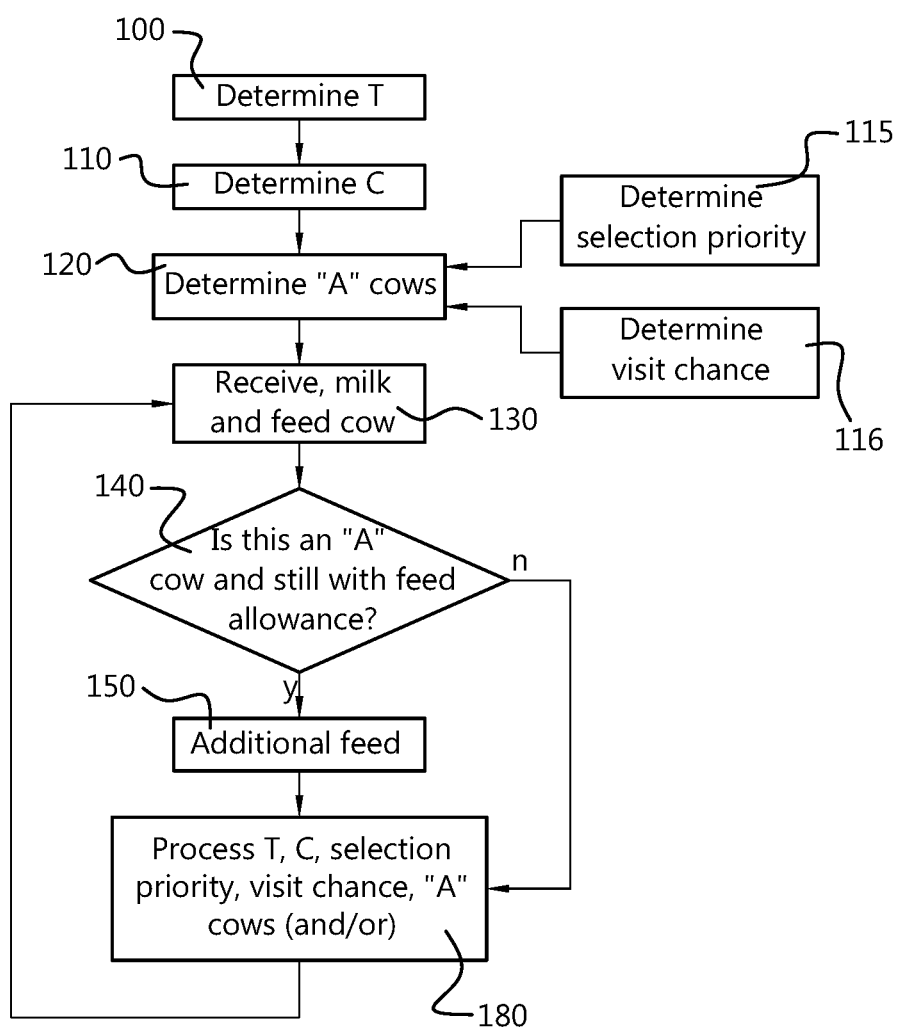

The invention will be explained in more detail below with reference to the drawing. This shows:

FIG. 1 a schematic top view of a robot milking device according to the invention, FIG. 2 schematically, a step sequence of a method according to the invention, and FIG. 3 a refinement of the method from FIG. 2.

FIG. 1 shows a schematic top view of a robot milking device 1, also referred to below as a robot, according to the invention. This comprises a central part 2 and a milking site or milking stall 3, and an accommodation area 20 with milking cows A and B.

The central part comprises a robot arm 4 with milking means 5 and a controller 10. The milking stall 3 comprises a feed trough 6 and an animal identification device 7. Signs 8a-8d indicate antennae of an optional animal location system, and 9 indicates animal ID tags. Also optional is a waiting area 21 with an entry gate 22, a waiting area animal identification device 23 and an exit gate 24.

The robot milking device 1 comprises a central part 2 in which for example a vacuum pump, a milking glass and other equipment required for robot milking are provided. A controller 10 is also provided for controlling the device and the robot arm 4. This carries milking means 5, namely four milking cups for extracting milk in the milking stall 3 from the four teats of the milking cows A and B. In addition, other numbers of milking means/milking cups are possible, such as two for goats, and it is also possible to provide an alternative structure of the milking part of the robot milking device such as a milking cup magazine and a robot arm with a gripper, which in each case takes a milking cup from the magazine and brings this up to a teat, with the help of a teat detection device (not shown here).

The robot milking device 1 furthermore comprises a feeding device, here indicated as a trough 6. When a cow A or B attends the milking stall 3, it is identified by the animal identification device 7 from the animal ID tag 9 which she wears around her neck. The information belonging to the animal ID enables the robot 1 to milk the cow suitably and individually, and to give the cow the appropriate ration of concentrate in the trough 6. From a storage holder (not shown here), the controller 10 can deposit concentrate into the trough, from which the cow can eat during milking. The ration is divided into a number of portions to prevent waste and also because the cow cannot eat very quickly. It may even occur that, during the milking event, the cow cannot fully eat her allocated portion of concentrate or "feed allowance". In particular in the case where the robot 1 is the only site at which the cows A, B can eat concentrate, this can lead to a feed deficit, which is unfavorable for milk production or even for the health of the cow. Often, the robot is now the only place where concentrate is given, not only because the robot 1 is provided with an animal identification device 7, whereby the robot can provide concentrate specifically to each animal, but also because the attractive effect of concentrate in the robot will diminish if the concentrate is given elsewhere.

In the prior art, it is therefore possible to specify in the robot 1, per cow, that after milking of the respective cow, feed must be provided until the feed allowance has been eaten. This however means that, for a shorter or longer period, the robot is occupied only with feeding while other cows are waiting to be milked. The capacity of the robot 1 for milking is therefore reduced.

The present invention counters this disadvantage by the understanding that the visit frequency to the robot varies during the day. This means that sometimes there is no time for feeding, but there is such time at quiet moments. When it is quiet and the robot is not milking a cow, no capacity is wasted if a cow, which is not being milked but still has feed allowance, is actually given additional feed, in any case at least partially.

In the embodiment shown, this takes place as follows. The controller 10 has information on the visit frequency or occupation level of the robot 1 as a function of the time of day. On the basis of this information, the controller 10 can estimate how much time is available in a period for additional feeding because the robot 1 is not occupied. This available time is here known as "free capacity C". The free capacity C also varies during the day in the opposite way to the occupation level. Often, in certain periods of the day, this free capacity C is insufficient for providing additional food for all cows, and the controller 10 must make a selection. A sub-group of cows is then given the opportunity to receive additional feed during a visit to the robot 1, and another complementary sub-group is not given this opportunity. In the figure, this is indicated per cow by the letter A (provide additional feed) or B (do not provide additional feed). Note that these sub-groups may also vary with the time of day, but not necessarily.

If a cow A visits the robot 1, it will be milked and fed during milking as normal. But cows 'A' also receive additional feed, for example until they have eaten their entire feed allowance. Furthermore, it is also possible to provide less than the entire remaining feed allowance, such as half. If however a cow 'B' arrives, she is milked and fed during milking, but when milking is complete, she must leave the milking stall 3 even if she still has remaining feed allowance.

The farmer may determine which cow is given 'A' status and which cow is given 'B' status. For example, the farmer can designate one or more cows as 'A' if they are recovering from an illness, or producing a particularly large amount of milk and consequently need a lot of concentrate, which they probably cannot eat in the time.

However, the invention is not used to the optimum with such a fixed division into sub-groups A and B. In any case, at times when there is plenty of free capacity C, many cows can receive additional feed. The sub-group of 'A' cows will then be relatively large. But at busy milking times, there is little free capacity C, and the following may occur. At the beginning of the selected time period, by chance one or more cows 'A' will arrive that only just deserve this status. These will use up the available free capacity and the 'A' cows with the greatest need will then be slip through the net.

To further improve the advantage of the invention, the possibility is created of allowing the controller 10 to automatically determine the sub-groups of 'A' and 'B' cows. This will be explained in more detail below with reference to FIG. 2.

In the embodiment shown in FIG. 1, an optional waiting area 21 is also shown with an entry gate 22 and an exit gate 24. Access to the waiting area 21 is regulated by the waiting area animal identification device 23. When a cow is ready or almost ready for milking and reaches the entry gate 22, after identification by the device 23, she is allowed into the waiting area 21. If she is not yet ready (or is far from ready) for milking, she is not allowed in. When the milking stall 3 becomes free for milking, the exit gate 24 and the entry gate of the milking stall (not shown separately) open and a cow can enter the milking stall to be milked.

An advantage of such a waiting area, known in itself, is that the controller 10 can better assess whether waiting cows are present, and hence whether or not free capacity C is to be expected. If the waiting area is empty, that is the case; if the waiting area is full, it is not the case. In addition, the controller 10 then knows in advance which cows are to be milked next. This can again be useful for making a more detailed selection of cows which may and cows which may not receive extra feed, even if all cows in the waiting area have the 'A' status. For example, the free capacity C may be unexpectedly greatly limited because of a fault or some slow milkings. On the basis of these developments, the controller 10 may also change the classification into 'A' and 'B' cows.

In the example shown, there are three cows in the waiting area 21, one of which has 'A' status and two have 'B' status. In this simple example, the controller 10 will be able to provide additional feed for the one 'A' cow and not for the 'B' cows.

The invention may be refined further by means of an animal location system, here in the form of four antennae 8a to 8d. These receive signals from the animal ID tags 9 equipped for this (for the sake of clarity, only shown on one cow but provided on all) and from this determine, for example by means of triangulation or similar, the position of the cow in the accommodation area 20/waiting area 21. From changes in the position, the controller can determine the path of the cow. So the controller 10 can with some certainty determine whether or not a cow will probably enter the waiting area 21 or robot milking stall 30 in the coming time. For example, the cow 'A' at the bottom left of the figure is far away from the robot milking stall 3 and the waiting area 21, and is apparently not walking in that direction. Despite the 'A' status, the controller will not then attribute a high selection priority to this cow. This is explained in more detail with reference to FIG. 2.

FIG. 2 shows schematically a step sequence of a method according to the invention.

In a first step 100, the controller 10 determines the future time period for milking and feeding the group of dairy animals. This period may for example be selected as the coming hour, or a period from e.g. 10 μm to 4 am (because at other times there will probably be no free capacity), or the period up to a planned cleaning. The latter takes place two or three times per day, and during this time milking is not carried out, so that in the time directly afterwards the robot will probably be busier and additional feeding will not be an option for some time.

When the time period is selected, the controller then determines the expectation value for the free capacity C. This may be determined on the basis of historic values, such as a visit frequency, the total occupation level or time, literature or experience values (for new groups of dairy animals) etc. The free capacity C is then the time which is available for the dairy animals to eat additionally provided feed.

Then the controller 10 determines for which dairy animals this free capacity will be made available during the time period, in other words the controller then determines the sub-group of the group of dairy animals for which the controller may continue to provide feed after said milking, by means of the feeding device. This determination may take place in many ways which can be selected arbitrarily by the user/farmer.

For example, a selection priority is assigned to the animals depending on certain properties and one or more criteria. This selection priority indicates a ranking of the importance of providing, or not providing, additional feed to a specific animal rather than to another animal. This ranking can be used for filling the free capacity.

Thus it is possible to take account of the needs and health state of the dairy animal. If a cow has been ill, it may be of great importance that feeding is optimised until she has completely recovered. In addition, there are cows which produce a great deal of milk and consequently need a lot of feed (concentrate). There is a high chance that they will not be able to consume all this feed during milking, which only takes a few minutes, so additional feeding is a suitable option. It may also be economically important to provide optimum feed for an animal which has a good feed conversion rate. Other reasons may be that an animal is in the lactation build-up phase, and for these reasons must be optimally fed or receive additional feed if there is still a feed allowance left after milking. In general, the lactation stage but also the lactation count is a possible component of the criterion for determining the selection priority.

There are also reasons which vary over time. In particular, the chance of remaining feed allowance after milking is important for allocating the dairy animal to one sub-group or the other. In any case, if the expectation value of the remaining feed after the expected milking time is very high, there is often also a high chance of a large remaining feed allowance after milking. This means that the animal may build up a feed deficit, and in any case is fed irregularly, which should preferably be avoided. It is also possible that an animal is a slow eater and for this reason may have a large feed deficit after milking. All the above reasons and criteria, and other conceivable criteria, may be used to determine a selection priority.

In addition, preferably the chance that a dairy animal will be milked at all in the selected time period and visit the robot 1 must also be taken into account. In any case, if an animal has been milked just before the start of the time period, and the duration is not very long with respect to the milking interval, there is a high chance that the dairy animal will not visit the robot. So even if this animal has a very high selection priority, it is probably pointless to reserve free capacity for her. Conversely, an animal with a very low selection priority, which needs milking at the start of the time period, has a very high chance of visiting the robot. Then it is certainly useful to take this into account and for example allocate capacity in order to be able to provide in any case part of any remaining feed allowance.

On the basis of any part of the above information, the controller 10 thus determines a selection priority. Partly on the basis of the visit chance, the controller 10 then establishes a priority order of animals for which capacity should be reserved, in other words for which additional feed may be provided after milking. The controller may then allocate the free capacity C to dairy animals. So the entire free capacity may be allocated, starting with the animal the highest combination of selection priority and visit chance, by reducing the expectation value of the remaining feed allowance of the animal divided by the feeding rate (animal-specific or average), repeating this action for the animal with the next highest combination of selection priority and visit chance etc., until the free capacity has been completely allocated. It is also possible to allocate less than the complete capacity, e.g. to leave some flexibility in case all animals actually attend the robot, perhaps even if some milkings take slightly longer, and at the end of the period there is a (longer) waiting time. Conversely, it is also possible to reserve just more than the free capacity, assuming that not all expected animals will attend for a visit to the robot, so that in any case all animals which do attend can if necessary be given additional feed. For example, between 80% and 150% of the free capacity C may be used for allocation to the dairy animals.

The animals for which part of the free capacity is allocated form the sub-group of the group of dairy animals for which the controller may continue to provide feed after said milking. These animals, after their milking has ended, receive additional feed if they still have remaining feed allowance.

It is now possible to begin the planned time period, and milk and feed the dairy animals which visit the robot, with or without additional feed depending on the sub-group to which they are assigned. The animals are then received, milked and fed (with or without additional feed) in the robot 10 until all animals have been processed. Then the entire method is repeated for a new time period.

Alternatively, and as a refinement, the method is as shown in FIG. 3. Here again, a time period T is determined, a free capacity C and optionally a selection priority and/or visit chance (steps 100, 110, 115 and 116), after which the sub-group of cows to receive additional feed is determined (step 120). It is now also possible to repeat the method after each milking, and where necessary and possible, adapt the numbers. One or more of the following may be considered here:

adapting the time period: if some of the time has elapsed, less time remains. All the time period can be shifted in time, such as to the next hour etc.

adapting the free capacity C: deduct the duration of the one or more visits so far from the time period and offset this against the free capacity for the shorter time period. Or regard the available time as a time period which has been shifted in time but just as long, for example with the shifted hour.

updating the feed allowance for all animals, and hence adapted in time. For some animals, the absolute number increases more quickly than for others, so the expectation value for the remaining feed allowance may also change.

if an animal has actually already been milked, the animal in principle should be removed from the sub-group for the current period. Perhaps there is capacity left for another animal? And so on.

It is pointed out in general that it is possible that the milking event takes much longer than expected, for example because connection takes longer than expected, a milking cup is detached and reconnected, or another fault occurs in the milking process. It may then occur that the animal has been able to eat its complete feed allowance, and need not be included in the sub-group of 'A' animals which may receive additional feed. Also, the milkings of the animals in the other sub-group may naturally influence the classification, the selection priority and even the visit chance of the animals from the one sub-group of animals which should receive additional feed.

It will be clear that, on use of the refined method according to FIG. 3, the feeding of the dairy animals may be more flexible, dynamic and precise, whereby animal health and milk production are optimally supported.

The embodiments shown are not intended to be restrictive but serve merely for illustration and explanation of the invention. The scope of protection is determined by the appended claims.

The invention claimed is:

1. A method for automatically milking and feeding a group of dairy animals by means of a robot milking system which is provided in an area in which the dairy animals can move freely, and which robot milking system comprises:
    a milking site for receiving a dairy animal;
    an animal identification device for determining an animal identity of said dairy animal;
    robot milking means for fully automatically extracting milk from said dairy animal during a milking;
    a feeding device for providing feed to said dairy animal at the milking site during said milking on the basis of a feed allowance for said dairy animal; and
    a controller which is configured for controlling the robot milking system and updating the feed allowance per dairy animal,
    wherein the method comprises the following:
    selecting a future time period;
    determining a free capacity C of the robot milking system as an expectation value for the total time during said future time period that the milking system will not be occupied by a dairy animal;
    determining a sub-group of the group of dairy animals for which the controller may continue to provide feed after said milking;
    milking, and feeding during the milking, the dairy animals that visit the milking system; and
    additionally feeding with the feeding device a dairy animal from the sub-group depending on the determined free capacity C, when said dairy animal still has a feed allowance after milking.

2. The method as claimed in claim 1, wherein the step of determining said sub-group comprises a user entering in the controller identities of only part of the group of dairy animals.

3. The method as claimed in claim 1, wherein the determining said sub-group is carried out automatically by the controller.

4. The method as claimed in claim 1, wherein the determining said sub-group comprises:
    per dairy animal, attributing a selection priority on the basis of a selection criterion that comprises at least said expectation value of the feed allowance after milking, and
    selecting the dairy animals with a highest selection priority in such a number as to comply with a predefined selection criterion.

5. The method as claimed in claim 4, wherein the selection criterion comprises that a sum, to be calculated by the controller, of eating times per dairy animal from the sub-group, belonging to said expectation value of the respective feed allowance after milking, is at most equal to said free capacity or a predefined mathematical operation on said free capacity.

6. The method as claimed in claim 5, wherein said mathematical operation is a multiplication of the free capacity by a number between 0.8 and 1.5.

7. The method as claimed in claim 4, wherein the selection priority is partly attributed on the basis of a probability with which the dairy animal will be milked in said future time period.

8. The method as claimed in claim 4, wherein the selection priority is partly attributed on the basis of one or more animal properties other than the expected feed allowance after milking.

9. The method as claimed in claim 4, wherein the robot milking system comprises an upstream waiting area, wherein the controller is configured to determine the animal identity of the dairy animals in the waiting area, and wherein the selection priority is partly attributed depending on the presence of a dairy animal in the waiting area.

10. The method as claimed in claim 4, wherein the robot milking system furthermore comprises a dairy animal location device which is configured for determining a location of the dairy animal in the area, and wherein the selection priority is partly attributed on the basis of the determined location in the area.

11. The method as claimed in claim 4, wherein the selection priority is partly attributed on the basis of a number of days in lactation and/or a lactation number and/or a milk production.

12. The method as claimed in claim 4, wherein the robot milking system furthermore comprises a dairy animal location device which is configured for determining a location of the dairy animal in the area, and wherein the selection priority is partly attributed on the basis of a distance from the determined location to the robot milking system.

13. The method according to claim 1, wherein the free capacity is determined on the basis of historic values such as a measured idle time and/or the visit frequency to the robot milking system, and/or planned periods for cleaning or maintenance of the robot milking system, in each case as a function of a time of day.

14. The method according to claim 1, wherein said future time period is the time period until a future planned cleaning or maintenance, or a predefined fixed time period.

15. The method according to claim 1, furthermore comprising repeating the method according to claim 1.

16. A robot milking system for milking a group of dairy animals, comprising:
    the milking site for receiving the dairy animal;
    the animal identification device for determining the animal identity of said dairy animal;
    the robot milking means for fully automatically extracting milk from said dairy animal during a milking;
    the feeding device for providing feed to said dairy animal at the milking site during said milking on the basis of the feed allowance for said dairy animal; and
    the controller which is configured for controlling the robot milking system and updating the feed allowance per dairy animal, and for performing the method as claimed in claim 1.

17. The robot milking device as claimed in claim 16, furthermore comprising an upstream waiting area.

18. The robot milking device as claimed in claim 16, wherein the robot milking device is provided in an area in which the dairy animals can move freely, and also comprises a dairy animal location device which is configured for determining a location of the dairy animals in the area.

* * * * *